Oct. 12, 1971  G. V. HENSON  3,611,584
METHOD AND MEANS FOR TREATING GARBAGE
Filed Sept. 29, 1969

INVENTOR
GEORGE V. HENSON
BY
Zarley, McKee & Thomte
ATTORNEYS

United States Patent Office 3,611,584
Patented Oct. 12, 1971

3,611,584
METHOD AND MEANS FOR TREATING GARBAGE
George V. Henson, Zearing, Iowa 50278
Filed Sept. 29, 1969, Ser. No. 861,679
Int. Cl. F26b 7/00
U.S. Cl. 34—12                                 2 Claims

ABSTRACT OF THE DISCLOSURE

A means for treating garbage, comprising a cylindrical perforated tumbler rotatably mounted in an insulated housing. Shredded garbage is fed into one end of the tumbler and is tumbled along the length thereof to its discharge end. Heated air is forced through the tumbled garbage as it passes from one end of the tumbler to the other to dehydrate the same prior to its being discharged from the discharge end of the tumbler into a shredder mill. The air is heated by a flame fired heater means which is positioned outwardly of the housing to prevent the flames thereof from igniting gases which may be produced by the garbage. The tumbler is provided with tumbling or stirring rods mounted therein which enhance the tumbling action of the garbage. A method of dehydrating the garbage is also disclosed which prevents the ignition of the gases produced by the garbage while efficiently dehydrating the garbage.

---

The problems associated with garbage and its disposal are becoming more and more serious as the population ever increases. At present, garbage is generally disposed of by burning, burying or dumping the same. Garbage burning results in air pollution while garbage dumping results in the creation of unsightly and unsanitary areas. Garbage burying obviously requires large landfill areas which involves considerable expense. Devices have been provided to treat the garbage to decrease the volume thereof and which also permits the garbage to be used as fertilizer, compost, etc. However, the devices presently available do not efficiently treat or condition the garbage in a sufficient quantity to handle large volumes of garbage. Additionally, the gas fired garbage treatment devices frequently experience explosions therein when the gases produced by the garbage come into contact with the flame fired heaters used in treating the garbage.

Therefore, it is a principal object of this invention to provide a device for treating garbage.

A further object of this invention is to provide a device for treating garbage which prevents the explosion of gases produced by the garbage.

A further object of this invention is to provide a garbage treating device which efficiently reduces the total volume of the garbage being treated.

A further object of this invention is to provide a garbage treatment device of the gravity feed type.

A further object of this invention is to provide a garbage treatment device including means to efficiently stir and tumble the garbage as it is being passed therethrough.

A further object of this invention is to provide a garbage treatment device which is economical of manufacture, durable in use and refined in appearance.

A still further object of this invention is to provide a method of treating garbage wherein raw garbage is first pulverized, then dehydrated and finally pulverized again.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
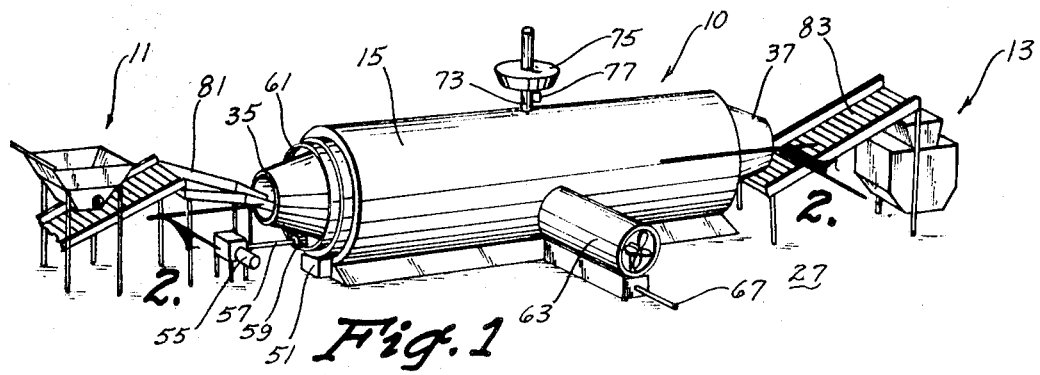
FIG. 1 is a perspective view of the device of this invention.

The device of this invention is generally designated by the reference numeral 10 and is preferably used in conjunction with mills 11 and 13 which are designed to pulverize, shred and grind the garbage as will be explained more fully hereinafter.

The numeral 15 generally designates an elongated cylindrical housing having opposite ends 17 and 19 and a hollow interior 21. As seen in the drawings, the housing 15 is preferably constructed of a metal material and is lined with an insulation material 23 such as firebrick or the like. Housing 15 includes a base portion 25 adapted to engage a supporting surface 27.

Figure 2:
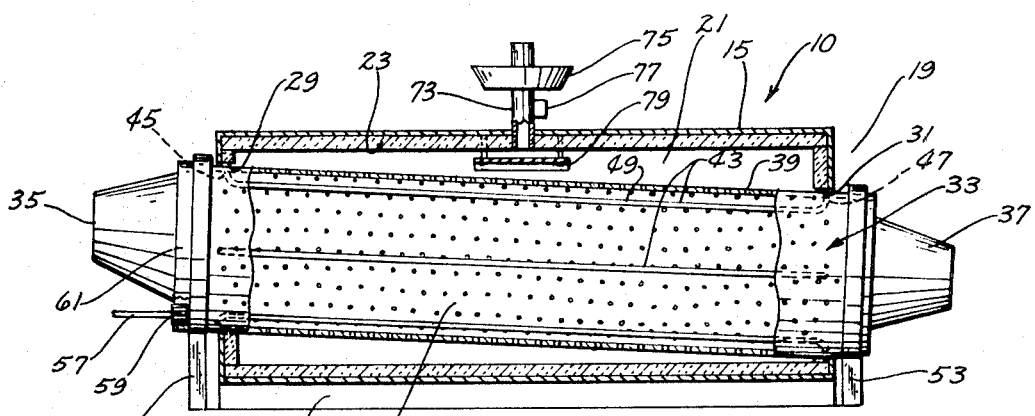
FIG. 2 is an enlarged sectional view as seen along lines 2—2 of FIG. 1 with portions thereof cut away to more fully illustrate the invention.

As seen in FIG. 2, housing 15 is provided with circular openings 29 and 31 formed in ends 17 and 19 respectively. An elongated cylindrical tumbler 33 is rotatably mounted in housing 15 in an inclined condition with respect thereto as illustrated in FIG. 2 and has its ends rotatably extending through the openings 29 and 31. Tumbler 33 includes a garbage intake end 35, garbage discharge end 37 and a body portion 39. As seen in the drawings, body portion 39 is provided with a plurality of perforations 41 formed therein to permit the flow of heated air therethrough as will be explained hereinafter. Tumbler 33 is provided with four tumbling or stirring rods 43 provided in the interior thereof to stir or tumble the garbage as tumbler 33 is being rotated. Each of the rods 43 include opposite end portions 45, 47 and a straight portion 49 extending therebetween which is spaced from the interior wall surface of tumbler 33 as illustrated in the drawings. The opposite ends of tumbler 33 are rotatably mounted on suitable bearing means 51 and 53 with rotation to the tumbler being provided by means of a power means 55. Power means 55 has a rotatable shaft 57 extending therefrom which has a gear 59 mounted on the outer end thereof which is in mesh with a gear rack 61 provided at the intake end 35 of tumbler 33. As seen in FIG. 2, the intake end 35 of tumbler 33 is positioned above the discharge end 37 thereof so that the garbage will be gravity fed therethrough.

Figure 3:
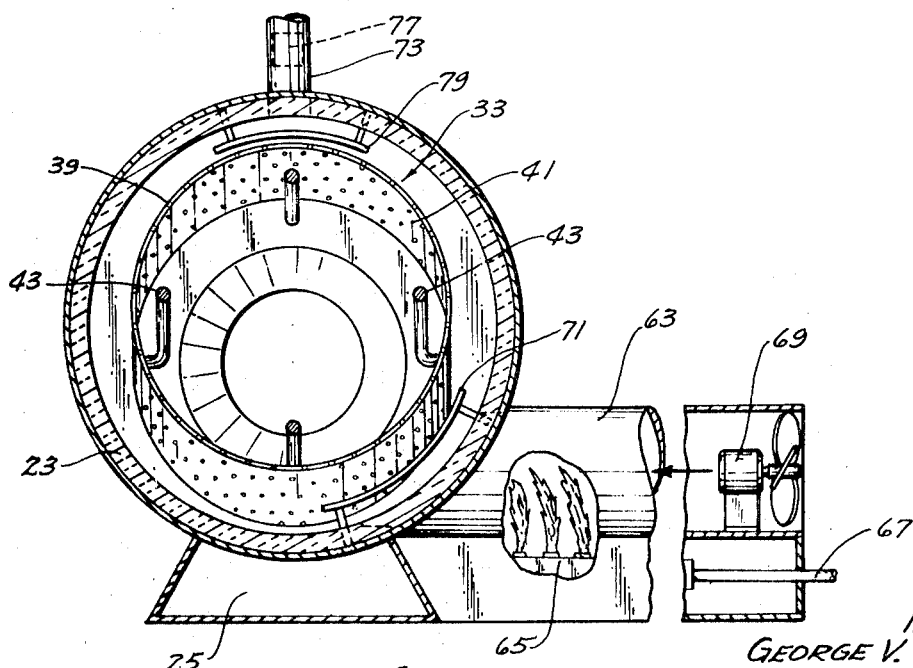
FIG. 3 is a transverse sectional view of the device with portions thereof cut away to more fully illustrate the invention.

The numeral 63 refers generally to a heat conduit extending outwardly from the lower central portion of housing 15 as illustrated in FIGS. 1 and 3 and which is in communication with the interior thereof. The numeral 65 designates a gas fired heater means which is positioned below the heat conduit 63 outwardly of the housing 15 as best illustrated in FIG. 3. Heater means 65 is connected to a source of ignitable fuel by a conduit 67. Blower means 69 is provided in the outer end of heat conduit 63 and is adapted to force air inwardly through the conduit 63 and into the interior of the housing 15 so that the heat produced by the heater means 65 is forced into the interior of housing 15. A baffle 71 is provided in the interior of housing 15 inwardly of the inner end of the heat conduit 63 to cause the heated air to be more efficiently deflected around the tumbler 33.

An exhaust conduit 73 extends upwardly from the upper central portion of housing 15 and has an air filter means 75 provided thereon to purify the fumes and gases escaping from the interior of the housing 55. A heat control means 77 is operatively connected to the heater means 65 to control the operation thereof. In other words, heat control means 77 will deactivate the heater means 65 when the exhaust temperature in the conduit 73 reaches a predetermined level. A baffle 79 is provided in the interior of housing 15 at a point below the lower end of conduit 73 to prevent an excessive amount of heat from escaping from the interior of housing 15.

Raw garbage is fed into the pulverizing mill 11 where it is pulverized, ground and shredded prior to it being fed to the intake end 35 of tumbler 33. The pulverized garbage is fed to the intake end 35 of the rotating tumbler 33 by means of a conveyor system 81. Inasmuch as the intake end 35 of the tumbler 33 is elevated above the discharge end 37, the garbage will pass therethrough due to the action of gravity. The stirring or tumbling rods 49 effectively and efficiently cause the garbage to be stirred and tumbled as it passes through the interior of tumbler 33 to insure that the garbage will be properly treated. The blower means 69 forces heated air into the interior of housing 15 and around the exterior surface of the rotating tumbler 33. Heat enters the interior of tumbler 33 through the perforations 41 and causes the tumbling garbage to be dehydrated as it passes therethrough. An important feature of this device is the fact that the gas fired heater means 65 is positioned outwardly of the housing 15 as illustrated in FIG. 3 which prevents the flame thereof from coming into contact with gases in the interior of housing 15 which may be produced by the dehydrating garbage. The elimination of possible communication between the flame of the heater means and the potentially explosive gases prevents explosions from occurring in the device.

Gases are discharged from the housing 15 by means of the exhaust conduit 73 as previously described. When the garbage has been conveyed and tumbled from one end of the tumbler 33 to the other, the garbage has been dehydrated and substantially reduced in volume. The dehydrated garbage is discharge from the discharge end 37 of the tumbler 33 onto a conveyor system 83 which conveys the dehydrated garbage into the mill 13 where it is again pulverized, shredded and ground. The dehydrated garbage is discharged from the tumbler 33 in a somewhat hard or crusty condition and the mill 13 conditions the dehydrated garbage so that it may be more conveniently disposed of or so that it may be used as compost, fertilizer, etc.

Thus it can be seen that a unique device has been provided for dehydrating garbage which efficiently dehydrates raw garbage into a product which may be disposed more easily or which may be more readily used. The device described herein permits a large amount of garbage to be treated in a continuous gravity fed operation. The device of this invention insures that explosions will not occur since means has been provided for preventing the flame of the heater means from coming into contact with the gases which are produced by the dehydrating garbage. It can also further be seen that a unique method of treating garbage has been described wherein the garbage is first pulverized, then dehydrated and then again pulverized. Thus it can be seen that the device accomplishes at least all of its stated objectives.

I claim:
1. A method for treating garbage comprising:
   pulverizing raw garbage;
   tumbling said pulverized garbage in a rotating cylinder having a plurality of apertures in its outer cylinder walls; said cylinder being enclosed within a compartment;
   heating air by means of a flame located remotely from said compartment so as to prevent the gases produced by said garbage from communicating with the flame;
   introducing said heated air into said compartment at a first point;
   venting air from said compartment at a second point spaced from said first point whereby said heated air will circulate through said rotating cylinder when passing from said first to said second point and will dehydrate said garbage within said cylinder; and
   pulverizing said dehydrated garbage.

2. A method according to claim 1 wherein said heated air is introduced to said chamber below said cylinder and is vented from said chamber above said cylinder.

References Cited
UNITED STATES PATENTS

| | | | |
|---|---|---|---|
| 1,072,186 | 9/1913 | Smith | 34—133 X |
| 1,541,902 | 6/1925 | Collins | 34—133 X |
| 1,720,537 | 7/1929 | Barthel et al. | 34—133 |
| 2,213,668 | 9/1940 | Dundas | 110—15 |
| 2,850,809 | 9/1958 | Lamb | 34—135 X |
| 3,518,774 | 7/1970 | Reimer | 110—15 X |

EDWARD J. MICHAEL, Primary Examiner

U.S. Cl. X.R.

34—133